United States Patent [19]
Hallee et al.

[11] 3,761,889
[45] Sept. 25, 1973

[54] COMPUTER DIRECTED PROCESS CONTROL SYSTEM WITH ANALOG INPUT MULTIPLEXER

[75] Inventors: Donald O. Hallee; Robert Menot, both of North Easton, Mass.

[73] Assignee: The Foxboro Company, Foxboro, Mass.

[22] Filed: Feb. 24, 1972

[21] Appl. No.: 228,976

[52] U.S. Cl............................ 340/172.5, 235/151.1
[51] Int. Cl........................... G06f 3/00, G06f 15/46
[58] Field of Search.................. 340/172.5; 235/151, 235/151.1

[56] References Cited
UNITED STATES PATENTS
3,514,758   5/1970   Bennett............................ 340/172.5
3,582,901   6/1971   Cochrane et al. ................ 340/172.5
3,673,576   6/1972   Donaldson, Jr.................... 340/172.5

Primary Examiner—Paul J. Henon
Assistant Examiner—Melvin B. Chapnick
Attorney—Bryan, Parmelee, Johnson & Bollinger

[57] ABSTRACT

An industrial process control system including a digital computer arranged in a time-share configuration to perform calculations respecting a plurality of process conditions, and to produce corresponding command signals for respective process operators such as valves and the like. The system includes an analog multiplexer comprising a plurality of individual printed circuit switch cards each carrying a number of switch circuits adapted to be connected to corresponding analog measurement points. The computer sends to a multiplexing control unit, instructions identifying a specific analog point to be sampled, or identifying a sequential group of points to be sampled. The control unit operates in cooperation with circuitry on the switch cards to carry out procedures incident to sampling the identified analog points, converting the signal to digital format, and signalling the processor that the data is ready for transfer. The system is arranged to permit different types of switch cards, such as relay and solid-state switches, to be intermixed as desired, or changed in the field, without requiring accommodating changes in hardware or in computer software.

31 Claims, 7 Drawing Figures

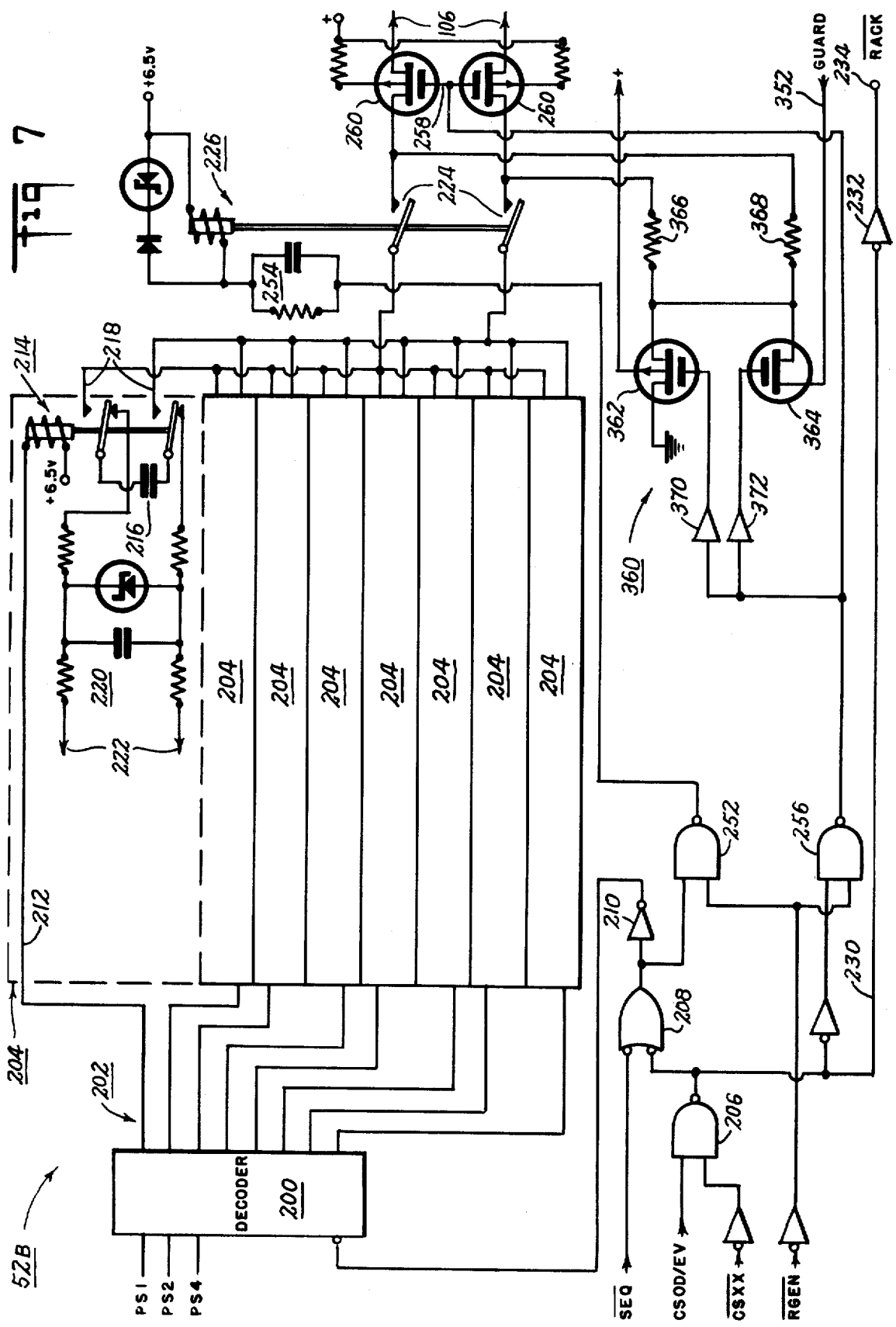

COMPUTER DIRECTED PROCESS CONTROL SYSTEM WITH ANALOG INPUT MULTIPLEXER

BACKGROUND OF THE INVENTION

1. Field of the Invention

This invention relates to industrial process control systems. More particularly, this invention relates to systems wherein a digital computer is used in a time-shared configuration to make computations respecting a large number of measured process conditions, such as temperature or flow rate, and to produce corresponding command signals to be sent to respective process valves, or the like, associated with the process conditions to be controlled.

2. Description of the Prior Art

A considerable number of computer-operated process-control systems have gone into commercial use during the past decade or so. Generally speaking, such systems have been either of the so-called supervisory type, where a digital computer establishes set points for a number of separate analog controllers, or of the direct-digital-control (DDC) type, where a digital computer sends command signals directly to valve-positioning instruments which merely carry out the instructions of the computer.

In either type of computer-operated control system, the computer must be supplied with digital input data representing the actual values of the process conditions to be controlled. This data accessing function typically is performed by a so-called analog input multiplexer. Such a multiplexer is a time-sharing device which can be considered as a multi-position switch arranged to connect, in any selected sequence, each of a large number of input lines to a single data line leading through an analog-to-digital converter to the computer. The sequence and timing of accessing such input data is controlled by the computer; that is, the computer, operating under program control, sends out instructions to select specific analog measurement signals for conversion to corresponding digital input data. General descriptions of such multiplexing equipment will be found in a variety of publications, such as U.S. Pat. No. 3,582,621 and related prior art.

There have been a number of problems with conventional analog multiplexing equipment as used in prior process control systems. One problem, for example, has been the relatively high cost of such equipment, resulting in part from the fact that the detailed design of each system had to be precisely tailored to the specific application.

Another problem has been presented by the fact that different kinds of analog input lines require different kinds of multiplexing switches. Thus, for some measurements, such as making readings of thermocouples having high common mode voltages, relay-type switches are needed, while for other input signals, solid-state switches are satisfactory and preferred because of their intrinsic high-speed switching capabilities. Since different processes generally require different combinations or assortments of the various types of available switches, the system designer has been presented with a serious complication in attempting to achieve an overall system design that is both suitably economical to manufacture, yet sufficiently flexible to meet the differing requirements of the different processes to be controlled.

SUMMARY OF THE INVENTION

The present invention is directed to providing improved analog input multiplexer apparatus for use with computer-operated process control systems, and to solving or minimizing certain difficulties with prior art multiplexers. In an important aspect of the present invention, the multiplexing apparatus includes one or more separate sets of "nests" of printed circuit cards each containing a number (eight, in a preferred embodiment) of individually-operable switches. Each card contains switches of only one type, e.g., certain cards carry relay switches, while others contain solid-state switches. The numbers of each type of card in any given system is determined solely by the use to which the control system is to be put.

All switch cards, regardless of type of switch each carries, have the same "interface" characteristics with respect to the rest of the system. Thus, all cards can be interconnected within the rest of the system without regard to switch type, and will present similar electrical characteristics to the data line.

In accordance with another aspect of the invention, each printed circuit card includes so-called "acknowledge" circuitry which, in response to selection signals developed by the central processor, sends an answering signal back to the multiplexer control circuitry to establish not only that the selected card is present and operative (i.e., to provide an error check), but also to establish what type of switch the card carries. The multiplexer control circuitry uses such information in controlling the nature and timing of further signals sent to the multiplexer card to complete the data transfer. Thus, the distinctions between the different types of switch cards are accommodated automatically by the control hardware, and the computer software need not be burdened by having to take into account such distinctions between the types of cards.

In accordance with a still further aspect of the invention, the multiplexer also includes a sequential scanning arrangement for permitting analog signals connected to slow relay-type switches to be sampled at a relatively high overall speed. In this arrangement, each switch circuit in effect comprises two series-connected switches, i.e., an initial switch of the slow relay type, and a final switch of high-speed, solid-state type. At the start of a sequential scanning operation, all of the initial relay switches of the selected set (one per card) are activated simultaneously, so as to sample all of the corresponding analog inputs. After allowing sufficient time for the relays to settle, the final switches are activated in sequence, to supply the corresponding measurement signal data to the central processor. The average time for sampling each line is significantly reduced by this arrangement because all of the selected relays settle concurrently within the period of time required for only a single relay to settle, and thereafter all of the selected outputs are scanned at high speed by the sequential scanning of the solid-state switches.

Other objects, aspects and advantages of the invention will in part be pointed out in, and in part be apparent from, the following description considered together with the accompanying drawings.

Brief Description Of The Drawings

FIG. 7 is a circuit diagram of the principal elements of a relay-type switch card.

Description Of The Preferred Embodiment

Figure 1:
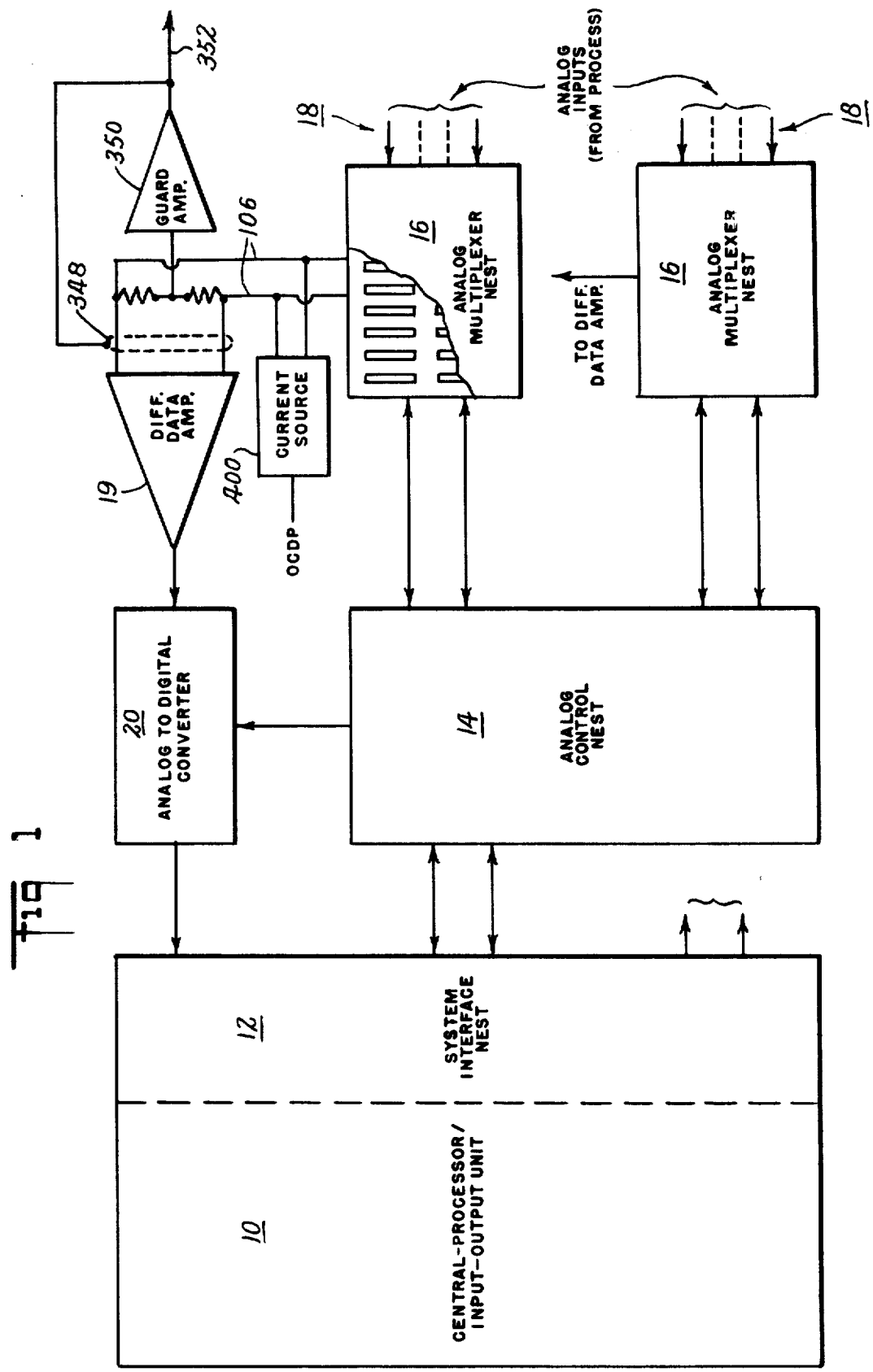
FIG. 1 is a block diagram representation of principal elements of a computer-operated process-control system to be described hereinbelow in detail.

Referring now to FIG. 1, the control system is shown to include a Central Processor/Input-Output (CP/IO) unit 10 which basically consists of a high-speed, stored program digital computer or processor, associated memories, and interface equipment used for bidirectional communication between the processor, core memory, and all input-output (IO) devices. The portion of the interface equipment to be referred to herein is identified in FIG. 1 as the System Interface Nest 12 (sometimes hereinbelow shortened to "Interface" for simplicity). This equipment performs a number of functions including the provision of synchronization for the analog multiplexing apparatus to be described below.

This multiplexing apparatus comprises an Analog Control Nest 14 which communicates with and controls a number (eight, in a presently preferred embodiment) of Analog Multiplexer Nests 16 each containing a plurality of individually activatable multiplexer switches for connecting any of the analog input lines 18 to an Analog-to-Digital converter 20. This converter supplies to the CP/IO unit digital signals representing the magnitudes of the analog measurement signals on the input lines 18.

Figure 2:
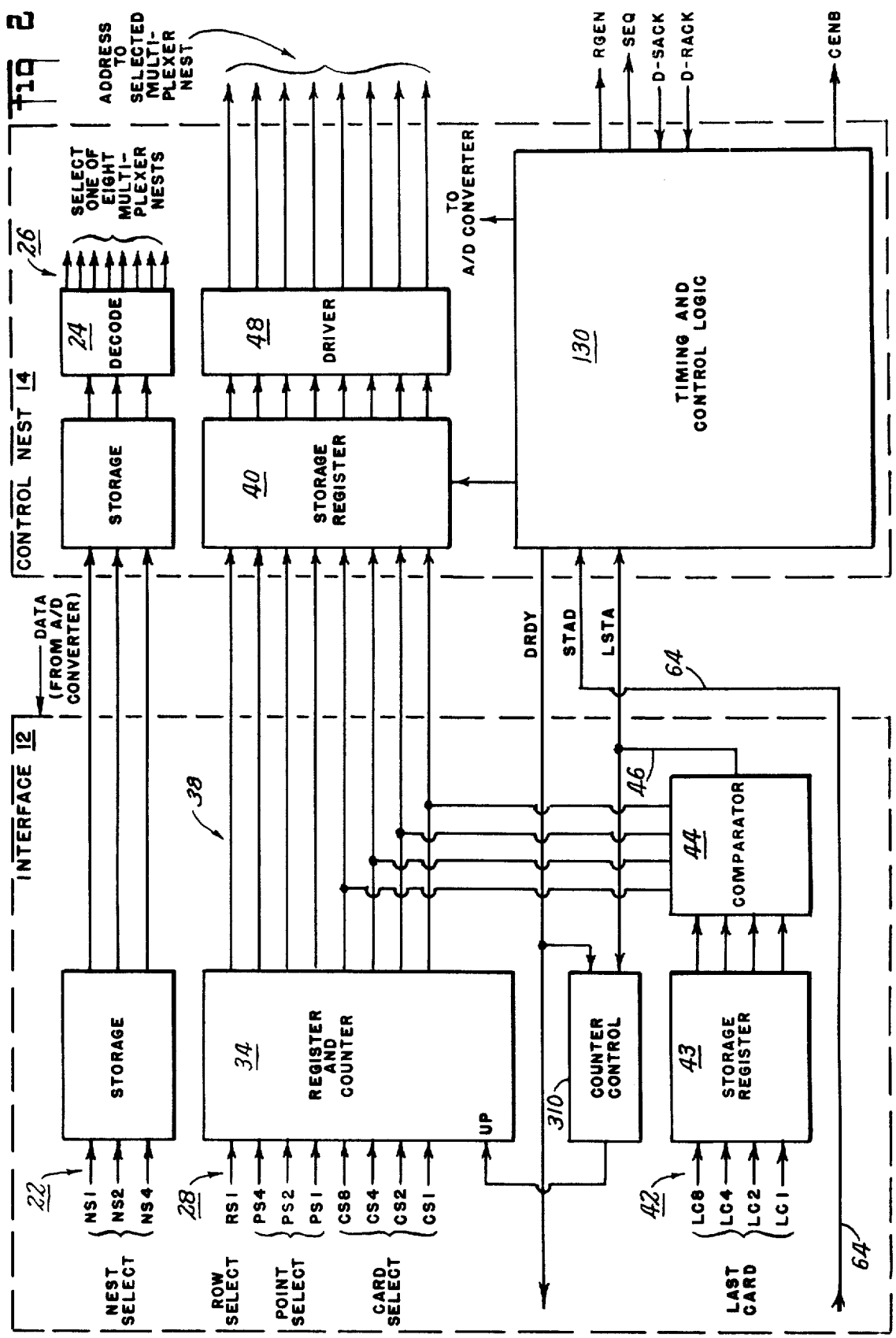
FIG. 2 is a block diagram representation of portions of the system interface and control nest.

The Interface 12 can be viewed as a hard-wired processor which receives instruction signals from the CP/IO Unit 10 and carries out such instructions independently, reporting back to the CP/IO unit at appropriate stages of its operation. The instructions from the CP/IO unit comprise a parallel-binary command word which includes an 11-bit address identifying each particular analog input signal or "point" to be sampled. As shown in FIG. 2, this command word address includes three nest-identifier bits on corresponding lines 22. These three bits together identify one of eight multiplexer nests (although only two of the nests have been shown in the drawings). This 3-bit signal is supplied to a decoder 24 in the Control Nest 14 to produce a corresponding multiplexer-nest-select signal on one of eight lines 26. In order to simplify the presentation, the description to follow concerns only a single multiplexer nest, and thus no further reference to nest selection will be made herein.

The command word from the CP/IO also includes an 8-bit address signal on corresponding lines 28. This signal identifies the particular point to be sampled in the selected multiplexer nest. One of these bits (called RS1, standing for "row select 1") identifies the row in which the selected printed circuit card is located. Four other bits (CS1, etc., standing for "card select 1", etc.) identify the specific card in the selected row, and the remaining three bits (PS1, etc., standing for "point select 1", etc.) identify the particular "point," or analog input terminal on the selected card. The complete 8-bit address signal is stored in a counter 34 from which the address signal is directed through lines 38 to the Analog Control Nest 14 for storage in a register 40.

The system described herein has the capability of carrying out a high-speed sequential scan of a series of adjacent switch cards, when so instructed by the CP/IO unit. In aid of that function, as will be explained in more detail, the command word from the CP/IO unit also includes a 4-bit address on lines 42, referred to as LC1, etc., (standing for "last card 1", etc.). This address identifies the "last card" of the sequential series to be selected. So that the Interface 12 can determine when the card being sampled is the "last card," the last-card address LC1, etc., is supplied to a comparator 44 together with the 4-bit card-select address from the output of the counter 34. When the two addresses are identical, a "compare" line 46 goes high for certain control purposes to be described. If no sequential scan is called for, this comparator circuitry can be disabled in any conventional fashion, as by means responsive to a control bit in the command word from the CP/IO unit.

Figure 3:
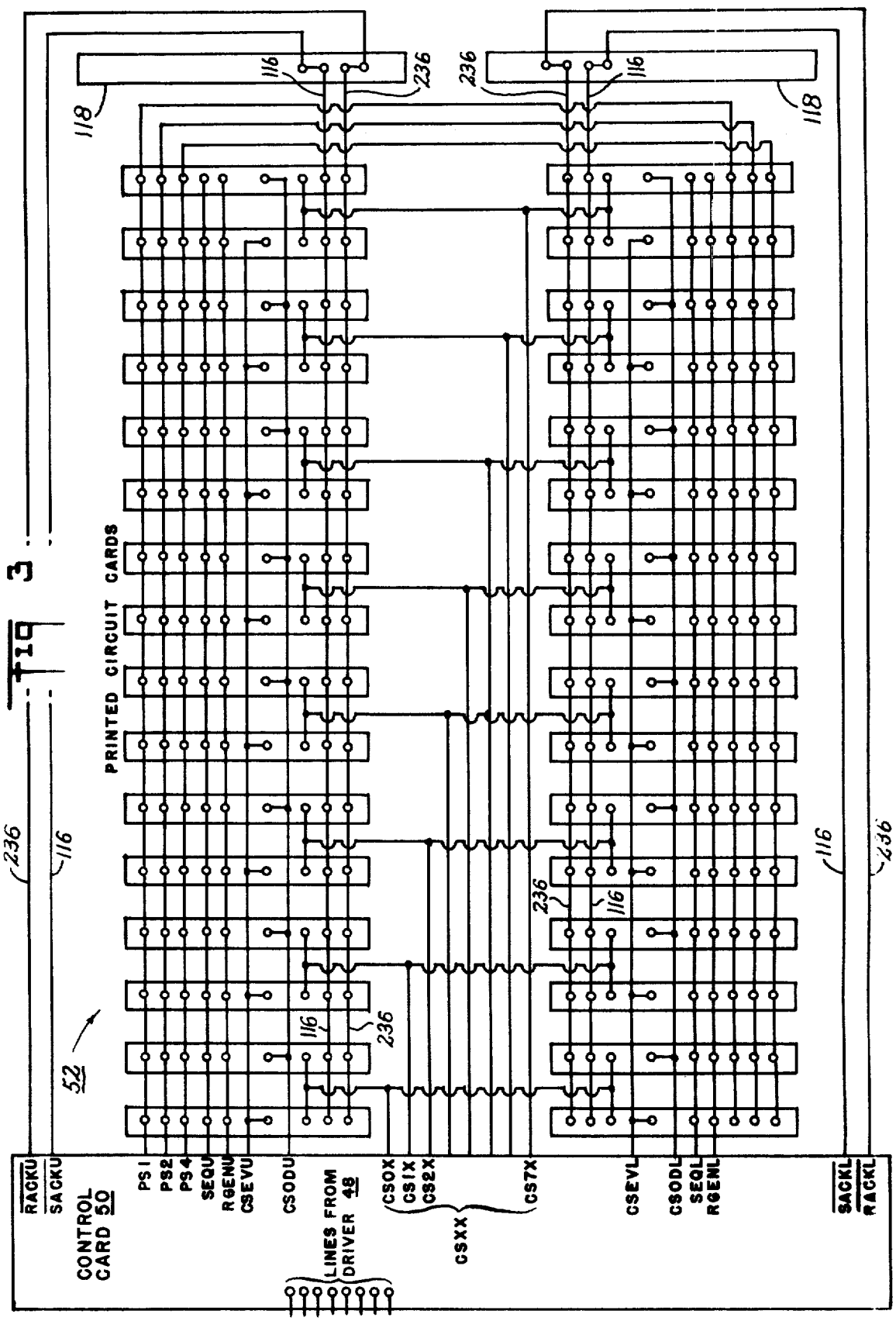
FIG. 3 is a pictorial illustration of the manner in which the printed circuit cards are wired in the equipment back-plane.

Returning now to the basic point-selection function, the 8-bit address signal stored in register 40 is directed through a set of driver circuits 48 which transmit the address to the selected multiplexing nest 16. Referring now to FIG. 3, this address signal is received in the selected nest by elements of a printed circuit card diagrammatically illustrated at 50, and containing certain control circuitry for the entire group of switch cards generally indicated at 52. This control card 50 converts the 8-bit address signal into corresponding signals for a group of output leads which are wired to all of the switch cards 52 in accordance with a predetermined pattern at all multiplexer nests.

One principal objective of the wiring arrangement to be described is that of minimizing the number of connector terminals or pins required on each switch card. To this end, only a part of the address decoding is performed by circuitry on each card. The remaining decode function is, in effect, performed by the back-plane wiring configuration.

In more detail, now, the three top leads labelled PS1, etc., carry the 3-bit point-select signal to all of the switch cards 52 in the nest. These three leads are connected to identically corresponding pins on the switch cards, which direct the signals to a 3-bit "point select" decoder on each card, as will be described.

Two leads respectively labelled CSEVU (standing for Card-Select, Even Card, Upper Row) and CSODU (Card-Select, Odd Card, Upper Row) are connected to corresponding pins in alternate switch cards 52 in the upper row of cards. Two similar leads CSEVL, CSODL are connected to the same corresponding pins in alternate cards in the lower row. With this arrangement, only a single pin on each switch card is needed to handle the incoming selection signals indicating which row the selected card is in, and whether the selected card is an "odd" or an "even" card in the layout sequence.

A final group of eight group-select leads CSOX, CS1X, etc., supply the remaining data needed to identify the selected card. Each of these leads serves four cards, and is connected to the same pin of each of the four cards. More specifically, each lead connects to a pair of adjacent cards in the upper row, and a corresponding pair of adjacent cards in the lower row. Thus, with only one additional switch card pin, the specific card is sorted out from the set of cards identified by the even/odd, upper/lower signals CSEVU, etc., previously discussed.

To select the particular switch card desired, it is necessary only to energize one of the eight group-select leads CSOX, etc., and one of the four even/odd leads CSEVU, etc. For example, by energizing CS3X and CSODU, card No. 07 is selected in the upper row. And if, at the time of that card selection, point-select lines PS1 and PS4 are energized, the point No. 5 of the eight points in the card will be selected (by a conventional decoder to be referred to subsequently).

Figure 4:
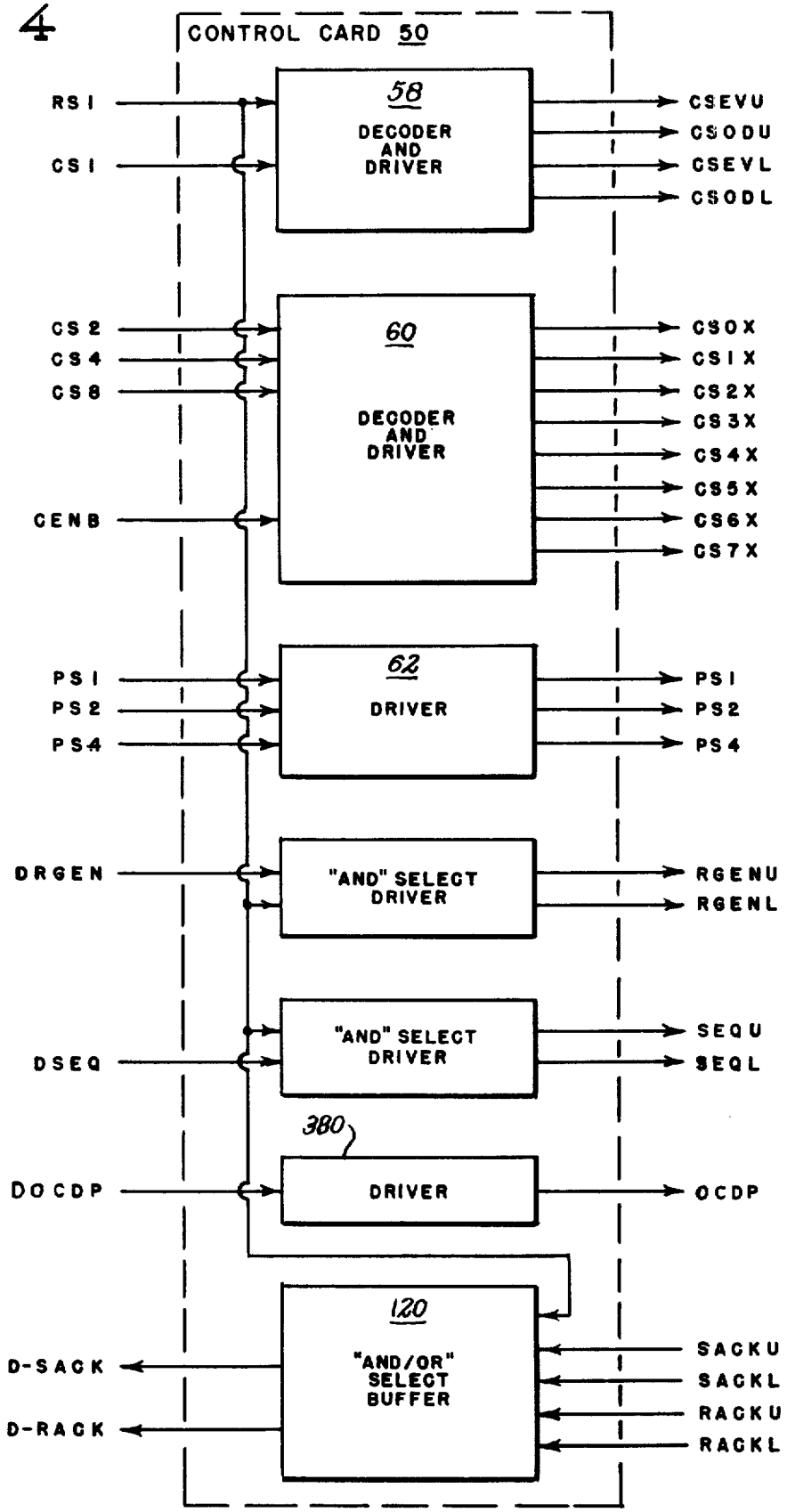
FIG. 4 shows, in block diagram form, the functional components of the control card in the multiplexing nest.

FIG. 4 shows details of the nest control card 50 to illustrate how the selection signals discussed above are developed from the address signals. Specifically, the row-select signal RS1 and the first card-select signal CS1 are fed together to a decoder 58 to energize the selected one of the four even/odd, upper/lower signals (CSEVU, etc.). The remaining three card-select signals CS2, etc. are fed to a decoder 60 to energize the selected one of the eight group-select signals CS0X, etc. The point select signals PS1, etc., pass straight through a driver 62 to the corresponding point-select leads for the entire group of switch cards.

As soon as the particular address has been specified by these signals, the read-out procedure is initiated. For this purpose, the Interface 12 (FIG. 2) develops on line 64 a "starting" signal in the form of a short pulse referred to as STAD (standing for Store Address). This signal is directed to the Control Nest 14 which functions to produce, at the trailing edge of STAD, a control signal referred to as CENB (standing for Card Enable) to be sent to the Analog Multiplexer Nest 16.

Returning to FIG. 4, this CENB signal is directed to the control card 50 where it gates on the group-select decoder 60 a short time after the point-select lines (PS1, etc.) and the even/odd select line (CSEVU, etc.) are activated. Thus, when CENB goes high, the selection of a specific card and a specific analog input point is complete, and the switch card read-out circuitry accordingly is activated in a manner now to be explained.

Figure 5:
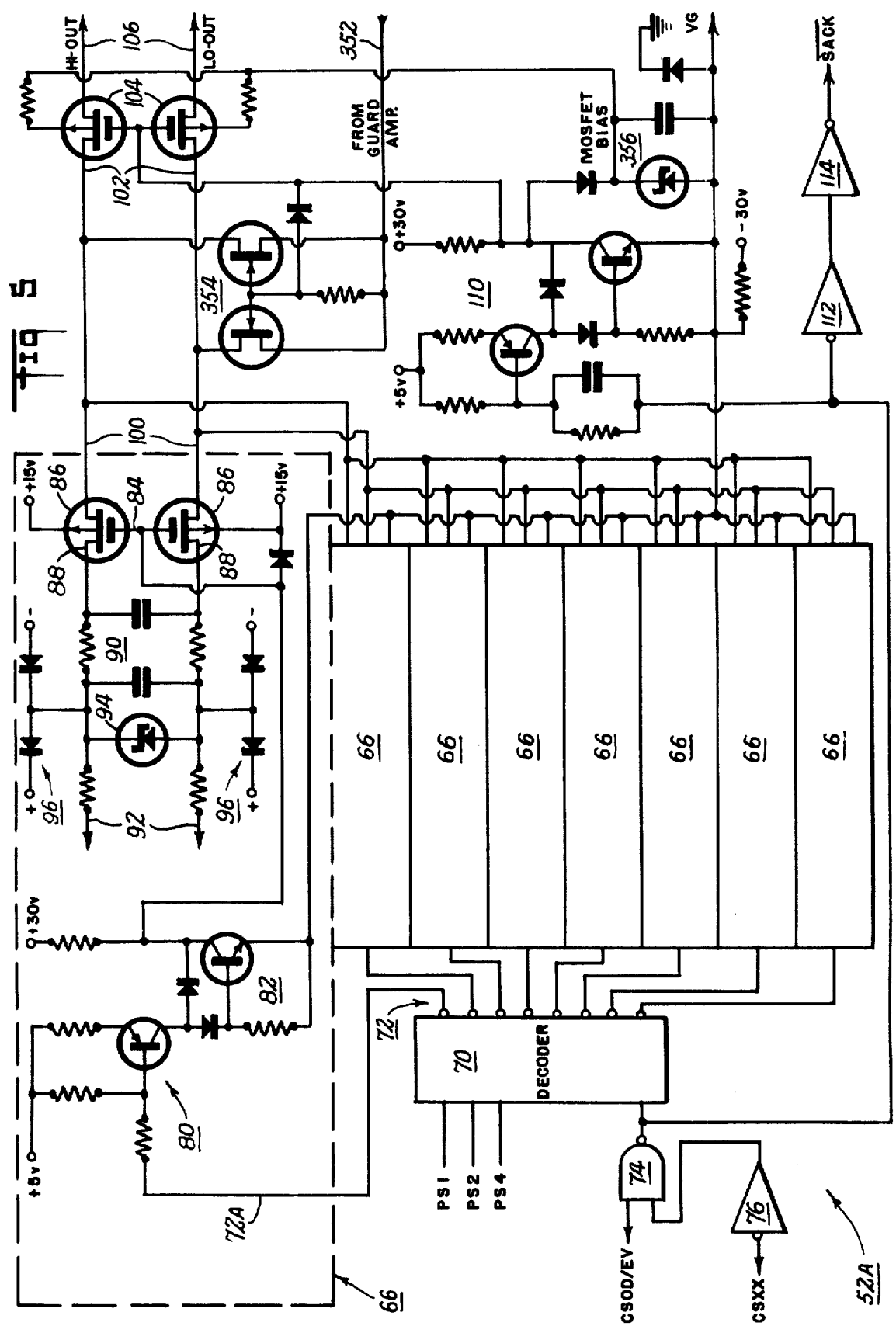
FIG. 5 is a circuit diagram of the principal elements of a solid-state switch card.

FIG. 5 shows the circuit details of one type of switch card 52A which could be wired into any of the nest positions shown in FIG. 3. This card carries eight high-speed, solid-state multiplexing switches generally indicated at 66. The details of only one such switch are shown, it being understood that the remaining seven switches are identical.

When this switch card 52A is to be selected for an analog reading, the first signals it receives from the common control card 50 are the point-select address code signals PS1, etc., and the even/odd select signal CSOD-/EV. The point-select address bits are directed to a conventional decoder 70 which activates one of eight output lines, generally indicated at 72, leading to corresponding individual switch circuits 66 for the eight points handled by the particular switch card selected. This decoder 70 is gated "on" by a signal from an And gate 74 which recieves the even/odd selected signal CSOD/EV and a signal from an inverter 76 driven by the group-select signal referred to generically as CSXX. Thus, the output of gate 74 is activated to its "select" level.

The point-select signal on the activated decoder lead 72A passes through a voltage-level-translator circuit 80 and a non-saturating switch 82 to the common gate electrodes 84 of a pair of MOSFET "point" switches 86. The source electrodes 88 of these switches are connected through a noise filter 90 to respective leads of one analog input channel 92. A Zener diode 94 and series-diode circuits 96 provide over-voltage protection for the switches.

The drain electrodes 100 of the MOSFET switches 86 are connected respectively to the source electrodes 102 of a second pair of MOSFET switches 104 arranged to deliver the sampled analog measurement signal to a pair of output lines 106 for transmittal to a differential data amplifier 19, the output of which is connected to the analog-to-digital converter 20. The source electrodes 102 of switch 104 are connected in common to the output electrodes of the entire group of eight point switches (only one of which is shown).

The two switch elements 104 are referred to collectively as the output switch. The switch gate electrodes are activated by an amplifier circuit 110, similar to the circuitry 80, 82 previously described, and which receives its input from the And gate 74. Accordingly, the output switch 104 receives its switch signal at the same time as the point switch 86. However, the output switch is arranged to operate slightly faster than the point switch, for reasons related to another part of the system to be described later.

The signal from And gate 74 also passes through a pair of amplifiers 112, 114 to produce a control signal called SACK (standing for Solid-State Acknowledge). This signal is directed to a return line 116 (FIG. 3) which is common to all of the switch cards 52. This line passes through a so-called guard-amplifier card 118, common to a row of switch cards 52. (The purpose of the guard amplifier will be referred to hereinbelow.)

From the guard-amplifier card 118, the signal line 116 connects to a control card terminal identified as SACKU (the U standing for Upper Row), or, alternatively, to a terminal identified as SACKL (if the selected card is in the lower row). From these terminals the SACK signal is directed (FIG. 4) to an And/Or Buffer 120 which produces an active signal on an output line D-SACK (Differential-SACK) whenever (1) either SACKU or SACKL is active, and (2) the row select signal RS1 corresponds to the row of cards from which the SACK signal was received.

The D-SACK signal from Buffer 120 is sent to the Timing & Control Logic circuit 130, shown in block outline in FIG. 2, and which serves to initiate further control signals for (1) completing the sampling of the analog measurement signal, (2) converting it to digital format, and (3) transferring the data to the computer. (A detailed illustration of the logic functions performed in this circuit is shown in FIG. 6, to which reference will be made below.)

The D-SACK signal sent to the Timing & Control Logic 130 serves, in effect, to establish that the addressed switch card (52A) is in existence, that the circuit to the card is complete, that the card is of the type having a solid-state switch, and that the switch has been closed so that the analog data is available on the output line 106 leading through the Differential Data Amplifier 19 (FIG. 1) to the analog-to-digital converter 20.

Figure 6:
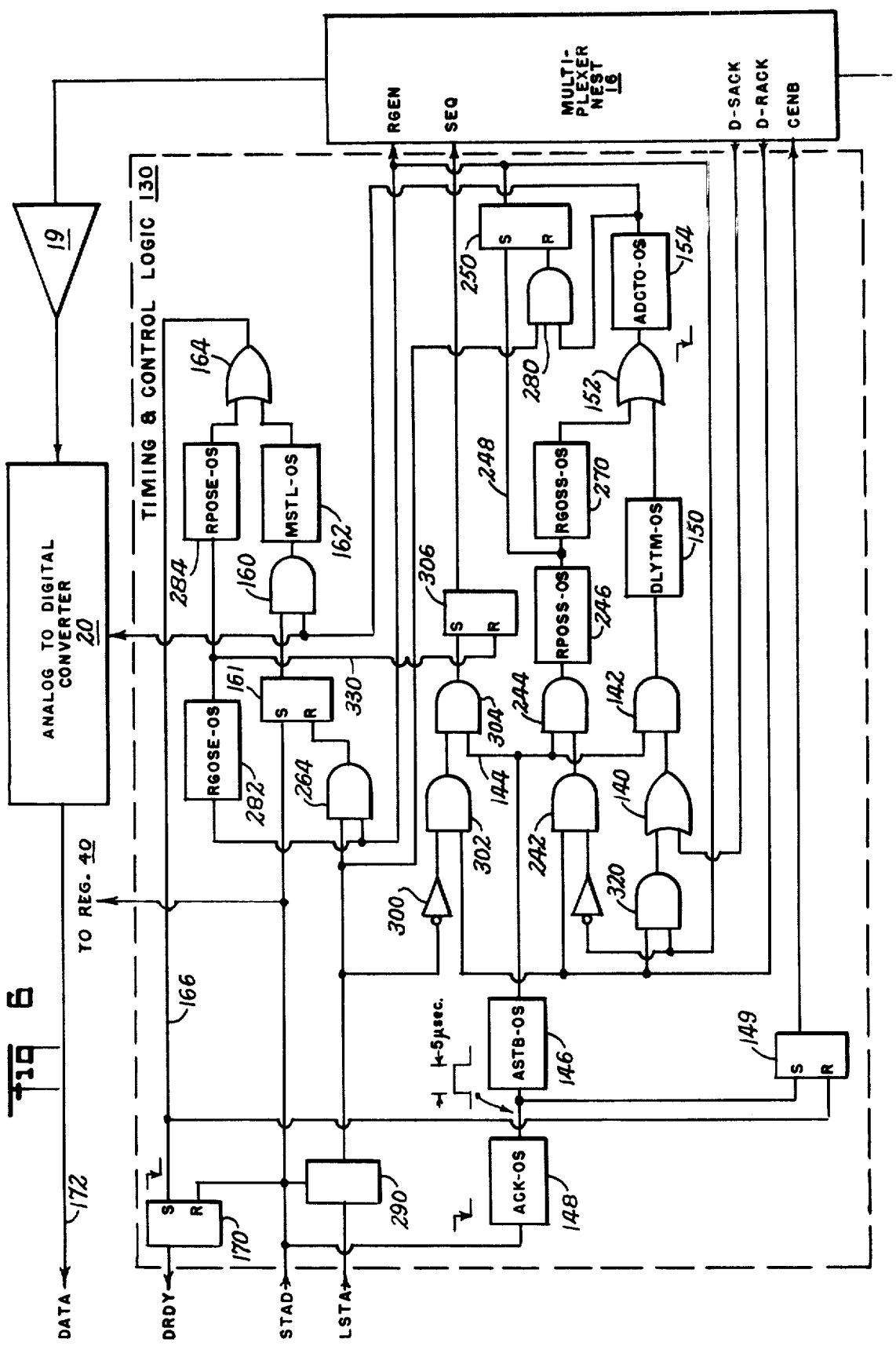
FIG. 6 illustrates logic circuitry for producing control signals for the multiplexing switch circuitry.

Referring now to FIG. 6, this D-SACK signal is fed through an Or gate 140 to an And gate 142, the other input line 144 to which is strobed 5 microseconds after CENB becomes active. For this purpose, line 144 is connected to the output of a one-shot multivibrator 146 (referred to as ASTB-OS, or Acknowledge Strobe - one-shot) which produces a short (0.2 microsecond) strobe pulse 5 microseconds after the end of the initiating STAD pulse.

This 5 microsecond delay is introduced by one-shot 148 (referred to as ACK-OS, or Acknowledge One-Shot) which produces the 5 microsecond timing pulse, starting at the trailing edge of STAD. The leading edge of this 5 micro-second pulse sets a Card Enable flip-flop 149 which produces the activating control signal CENB, referred to previously, to initiate the point-selection procedures described herein. The 5 microsecond pulse duration defines the period allotted to the multiplexing circuitry to carry out the point selection, and to acknowledge that such point selection has been completed.

When line 144 is strobed (and with the SACK line active), And gate 142 directs a signal to a one-shot 150 (also referred to as DLYTM-OS, or Delay Time, One Shot) which produces a timing pulse to set the allotted time for the point-selection and data amplifier circuitry to settle down to a stable condition, prior to making the requested analog reading. The duration of that timing pulse is determined by the system requirements. A 140 microsecond timing pulse may, for example, be used in a system required to sample analog inputs at a rate of 5,000 points per second.

This 140 microsecond timing pulse from one-shot 150 is directed through an Or gate 152 to another one-shot device 154 (also referred to as ADCTO-OS, standing for Analog-to-Digital Converter Time-Out One-Shot). This one-shot 154 is activated by the trailing edge of the 140 microsecond timing pulse, and produces a 40 microsecond A/D pulse, to set the time period allotted to the analog-to-digital converter 20 for making the conversion to digital format. The leading edge of this A/D pulse turns on the converter, to which the analog measurement signal already had been sent (from output line 106, via the differential data amplifier 19, FIGS. 1 and 5).

The trailing edge of the 40 microsecond A/D pulse initiates what might be termed the "close-out" functions, i.e., to deactivate the multiplexing circuitry, and to signal the CP/IO unit that the requested digital data is ready for transfer. For this purpose, the trailing edge of the 40 microsecond A/D pulse activates an And gate 160 (the other input to which has already been activated by the set output of a flip-flop 161, turned on by the original start signal STAD). The output of And gate 160 is fed to a one-shot 162 (also referred to as MSTL-OS, or Multiplexer Settling, One-Shot) which produces a 10 microsecond time-out pulse.

This time-out pulse is sent through an Or gate 164 to a signal line 166. The leading edge of the time-out pulse resets the flip-flop 149, and turns off the Card Enable control signal CENB. The trailing edge of the time-out pulse sets a flip-flop 170 which produces a control signal DRDY (Data Ready), indicating to the CP/IO unit that the requested data is available on output line 172 of the A-to-D converter 20. The CP/IO unit takes the digital data, thereby completing the multiplexing cycle. If another analog point is to be sampled, the CP/IO unit immediately initiates another multiplexing cycle.

As noted previously, the printed circuit switch cards 52 are not necessarily all alike, and the next switch card selected may, for example, be a "relay" card 52B as illustrated in the schematic diagram of FIG. 7. As in the solid-state switch card 52A, the three point-select signals PS1, etc. are directed to a decoder 200 arranged to activate one of the eight output lines 202 leading to corresponding relay switch circuits generally indicated at 204. The decoder 200 is gated on by a signal produced by the two signals CSOD/EV and CSXX applied through gates 206 and 208 and an inverter 210.

The activated output line 212 of the decoder 200 energizes a conventional two-pole "point" relay 214, e.g. of the mercury type, which pulls in to switch a so-called "flying capacitor" 216 to the output lines 218 of the relay. Prior to this relay actuation, the flying capacitor had been connected (through a noise filter 220) to a pair of incoming lines 222 carrying the analog measurement voltage to be sampled. Thus, the capacitor already had been charged up to a level representing such analog measurement.

The already-stored voltage on the flying capacitor 216 is directed by the relay 214 to the contacts 224 of a second conventional two-pole relay 226. This second relay is common to all the eight point relays 214 on the printed circuit card 52B, i.e., the movable contacts are connected directly to the output lines of all eight point relays on the card. Thus, relay 226 is referred to as the "group relay."

Conventional commercial relays suitable for use as "point" relays operate relatively slowly, compared to solid-state switches. Therefore, before actuating the group relay 226, time must be provided for the point relay not only to pull in, but also to completely disengage the capacitor 216 from the analog measurement lines. In accordance with one aspect of the present invention, this time delay is introduced by a special control circuit which detects that the selected card is of the relay type, and arranges accordingly to transmit to the selected relay card a group-relay energizing signal occurring a predetermined time after the point relay has been energized. Thus the processor software need not be custom designed to take into account this delay function.

The selected card 52B identifies itself as a relay card by producing a special acknowledge signal referred to as RACK (Relay Acknowledge). For this purpose, the card-select signal at the output of And gate 206 is directed through a line 230 and an Inverter 232 to an output connection terminal 234 of the switch card, labelled "RACK." This terminal is connected to a common multiplexing nest lead 236 (FIG. 3) wired to corresponding terminals of all of the cards in the row. The RACK signal on this lead is coupled through the guard-amplifier card 118 to a connector pin in the control card 50 which pin is referred to either as RACKU (identifying the card as one selected from the upper row) or RACKL (for a card selected from the lower row).

The signal from either of these connector pins RACKU or RACKL is directed to the And/Or Buffer 120 (FIG. 4) to produce a corresponding output D-RACK (standing for Differential-RACK), but only if the binary row-select signal RS1 corresponds to the row from which the acknowledge signal was received. This D-RACK signal is directed to the Timing & Control Logic circuitry 130 shown in FIG. 6, and signifies to that circuitry that the designated circuit card is present, that the circuit is complete, and that the card is a relay type requiring corresponding timed control signals.

In the Control Logic circuit 130, the D-RACK signal passes through an And gate 242 to another And gate 244 which is strobed at the end of the 5-microsecond "acknowledge" timing pulse on line 144, referred to previously. That is, this And gate 244 serves to check whether there has been a "RACK" response within the allotted 5 microsecond time period following initiation of the multiplexing cycle at the trailing edge of the STAD pulse.

The active output of And gate 244 is directed to a one-shot 246 (also referred to as RPOSS-OS, or Relay, Point, One-Shot, Start) which thereupon produces a timing pulse having a 1.5 millisecond duration. This period of time is provided to insure that the point relay 214 (FIG. 7) fully completes the transfer of the flying capacitor 216 to the relay output lines. This delay in activating the group relay 226 prevents any inadvertent connection to the customer's analog measurement signal circuit, and thus ensures against the possibility of damage from such connection.

At the end of this 1.5 millisecond point-relay timing period, the group relay 226 is energized. For this purpose, the output of one-shot 246 is fed through line 248 to a flip-flop 250 which is "set" by the trailing edge of the 1.5 millisecond pulse. The set output of this flip-flop is called RGEN (standing for Relay, Group Enable), and is directed through a corresponding line to the switch cards 52. There it is fed to an And gate 252 (FIG. 7) which, in the selected relay card 52B is already activated by the high output of gate 208. The output of And gate 252 is sent through an R-C circuit 254 to pull in relay 226.

The RGEN signal in the switch card 52B also is directed to another And gate 256 together with a high signal developed by an inverter receiving its input from the RACK line 230. The output of gate 256 activates the gate electrodes 258 of a pair of MOSFET output switches 260 connecting the respective relay output contacts 224 of the group relay 226 to the analog signal line 106. This signal line leads to the data amplifier 19 which supplies an isolated amplified signal to the analog-to digital converter 20.

The output switch circuitry 260 of the relay card 52B is identical in electrical characteristics to the output switch circuit 104 of the solid-state switch card 52A, FIG. 5. Thus, solid state and relay cards can be installed interchangeably in the multiplexing nest without requiring any changes to the interconnecting circuitry leading to the data amplifier and the analog-to-digital converter.

The RGEN signal from flip-flop 250 (FIG. 6) also passes through an And gate 264 to reset the flip-flop 161 previously referred to, in order to disable the read-out control circuitry 160, 162 which would otherwise produce a "Data Ready" signal 10 microseconds after the converter has completed its conversion. Such high-speed read-out operation is appropriate when the selected switch card is of the solid-state switch type (52A), but as will become apparent additional time is required to complete a relay data transfer function.

Thus, to disable the short-time (10 microsecond) path, the low output of flip-flop 161 turns off And gate 160, so that when the A/D pulse (to turn on the converter) eventually goes low, (as will be described below), no control signal will be developed by the MSTL one-shot 162.

The trailing edge of the 1.5 millisecond relay-setting pulse turns on another one-shot 270 (also called RGOSS-OS, standing for Relay, Group, One-Shot, Start) which produces a 5 millisecond timing pulse. This pulse defines the time allotted to insuring that the group relay 226 has fully settled to an extent appropriate for making an accurate reading. This timing pulse is directed through Or gate 152 and its trailing edge turns on the A-to-D converter one-shot 154 which produces its 40 microsecond A/D pulse as previously described. During this 40 microseconds, the converter 20 produces a digital signal accurately corresponding to the analog voltage sampled by the selected relay switches. This digital signal is placed on the "Data" line for subsequent transfer to the CP/IO unit, upon transmittal of the "Data Ready" DRDY signal.

Before transmitting a Data Ready signal to the CP/IO unit, the Analog Control Nest returns the actuated multiplexer circuitry to its normal standby state, ready for another data transfer. Thus, the selected relays 214, 226 must be de-energized, in proper sequence, and sufficient time must be allowed to permit the relays to settle back to their quiescent condition.

Accordingly, the trailing edge of the 40 microsecond A/D pulse from the converter one-shot 154 turns on an And gate 280, the output of which resets the flip-flop 250. Thus RGEN goes inactive when the A/D conversion is complete, thereby de-energizing the group relay 226, as well as the solid-state output switch 260.

The point relay 214 is held in energized condition for a moderate period of time after de-activation of the group relay 226, in order to assure that no inadvertent connection is made from the group relay to the customer's analog signal lines 222. For this purpose, the trailing edge of the RGEN signal triggers another one-shot 282 (also called RGOSE-OS, standing for Relay Group, One-Shot, End) which produces a 1.5 millisecond output pulse. The trailing edge of this output pulse activates still another one-shot 284 (also called RPOSE-OS, standing for Relay, Point, One-Shot, End) which produces a 2 millisecond timing pulse.

This 2 millisecond timing pulse is sent through Or gate 164 to line 166, and its leading edge resets the flip-flop 149 to turn off the Card Enable signal CENB. This de-energizes the point-relay 214. The trailing edge of the 2 millisecond timing pulse sets the flip-flop 170, to produce the Data Ready signal DRDY for the computer. Transfer of the digital data takes place shortly thereafter, upon execution by the CP/IO unit. The 2 millisecond pulse duration allows time for the point relay to completely settle back to its normal non-activated condition after CENB has been turned off and before making the data transfer to the CP/IO unit.

As noted above, the CP/IO unit may issue an instruction specifying that a number of measurement points, connected respectively to a sequential series of relay circuit cards 52B, be scanned in sequence. In such a scanning mode, the CP/IO unit sends to the Interface 12, over lines 42 (FIG. 2), a 4-bit address signal LC1, etc., to identify the last card of the specified group of switch cards. This last-address signal is stored in a register 43, and is coupled to comparator 44 for comparison with the initial card-select address CS1, etc., stored in the counter 34. At the start of operations, the compare line LSTA (Last Address) will be inactive, since the compared addresses are not identical. This low control signal is stored in a register 290 (FIG. 6) under control of the STAD pulse, and sets in operation various functions required to carry out the sequential scanning procedure now to be described.

The operation is initially quite similar to that previously described with reference to the selection of a single relay card. Thus, at the trailing edge of the STAD pulse, the Acknowledge one-shot 148 is activated to produce a 5 microsecond timing pulse. The leading edge of this timing pulse sets the Card Enable flip-flop 149 which transmits CENB to the Control Card 50 (FIG. 4) at the selected multiplexer nest 16. This signal gates on the group-select-signal CSXX at the initially selected relay card 52B (FIG. 7), and thereby energizes the point relay 214 for the analog voltage to be sampled, identified by the point-select-signals PS1, etc. CSXX also activates the logic circuitry which generates the relay-acknowledge signal RACK.

The RACK signal is sent back to the Timing and Control logic 130 (FIG. 6) where it passes through gate 242 and gate 244 (when strobed) to turn on one-shot 246. This one-shot produces a 1.5 millisecond pulse the trailing edge of which sets the RGEN flip-flop 250. The RGEN signal is returned to the multiplexer nest where, in the selected card 52B, it energizes the group relay 226 and the output switch 260. The trailing-edge of the 1.5 millisecond pulse from one-shot 246 also turns on a 5 millisecond one-shot 270 which defines the time allotted to permit the group relay to fully settle before making a reading. At the end of this pulse, the A-to-D converter 20 is turned on by the 40 microsecond A/D pulse from one-shot 154.

It may be recalled that when a single relay card is being selected, a time delay must be provided between making the A-to-D conversion and sending the "Data Ready" DRDY to the CP/IO unit, in order to permit de-activating the relays and to return them to fully stable quiescent condition. However, when carrying out a sequential scan of a plurality of relay cards, all of the relays are maintained in energized condition until the last card of the sequence is reached. Since the relays are not de-energized after each reading, the normal post-reading time delay is eliminated by disabling the time-delay circuitry. This disabling function is effected by the Last Card signal LSTA which, during a sequential scan, is inactive and disables And gate 264, thereby maintaining flip-flop 161 in set condition and holding gate 160 open to allow the read-out control signal (i.e., the trailing edge of the A/D pulse) to pass through this short-time-delay path to the Data Ready flip-flop 170.

The inactive LSTA signal also disables And gate 280 to prevent resetting of the RGEN flip-flop 250. Thus, in a sequential scan, RGEN remains high after each A-to-D conversion has been completed, until the last conversion is made.

The inactive LSTA signal also passes through an Inverter 300 to enable an And gate 302 for the RACK signal from the selected relay card 52B. The output of this gate is combined, in another And gate 304, with the 0.2 microsecond strobe pulse from one-shot 146. The output of gate 304 sets a flip-flop 306 which produces a control signal referred to as SEQ (standing for Sequential).

This SEQ signal is sent to all of the printed circuit relay cards 52B of the selected row (upper or lower). In each such card (FIG. 7), the SEQ signal serves to enable the selected point relay 214, the energizing circuit passing through Or gate 208, inverter 210, and the decoder 200. Subsequently, when RGEN becomes activated (as previously described), the SEQ signal enables the group relay 226 through an energizing circuit including Or gate 208 and And gate 252.

It may be noted that at the initially selected card 52B, one point relay 214 already is energized when SEQ becomes active. Thus, the initial effect of the SEQ signal is to energize the corresponding point relay on all of the remaining relay cards of the selected row. When RGEN thereafter becomes active, the group relays on all of the cards of that row pull in. However, only one output switch 260, on the initially selected card, will be closed. During the remainder of the scanning operation, the other output switches 260 are closed in sequential order, at a high rate of speed, under the command of the logic circuitry at the Interface 12.

As soon as the A-to-D converter 20 has completed its reading for the initial card 52B in the sequence, the CENB flip-flop 149 is reset, and the DRDY signal is produced 10 microseconds later by the flip-flop 170. Thus, the multiplexer is conditioned for the next read-out operation, i.e., for the next card in the sequence. For this purpose, and referring to FIG. 2, the DRDY signal together with the inactive LSTA signal activates a Counter Control circuit 310 to advance the Counter 34 one increment, thereby producing a new address signal CS1, etc., identifying the next card in the sequence.

The CP/IO unit, which has already accepted the digital signal from the preceding relay card, sends out another STAD pulse, indicating that the next reading in the sequence is to be made. The STAD signal functions as previously described to initiate the series of operations incident to obtaining a digital reading from the next addressed relay card. The STAD signal turns on the flip-flop 149, to send the CENB signal to the control card 50. This signal gates on the newly-selected card, i.e., CENB activates decoder 60 (FIG. 4) which turns on only one CSXX signal.

At the next selected card 52B, the CSXX and CSEV-/OD signals activate And gate 206, the output of which produces the relay acknowledge signal RACK and also passes through gate 256 to turn on the solid-state output switch 260. Accordingly, this switch closes, and, after a short period of time, is stabilized in its closed condition. Thus, a short time after the RACK signal is generated, the measurement signal stored on the flying capacitor is available at the output lines 106 leading to the A-to-D converter 20.

Since the selected point relay 214 and associated group relay 226 already were activated, there is no need to provide the relatively long delay times for bringing these relays in, or for assuring that the relays have fully settled down prior to making a reading. Thus, when the RACK signal is returned by the newly selected card, RGEN is active, and the And gate 320 (FIG. 6) is thereby opened to send a signal directly to the Or gate 140. As previously discussed, the signal produced by this Or gate initiates a series of circuit functions which, after a delay time defined by DLTYM-OS 150 (for example, 140 microseconds), turns on the A-to-D converter 20 and, after an additional 40 microseconds, cuts off the input to the converter and turns off the CENB flip-flop 149. Thereafter, the DRDY flip-flop 170 is set, to signal the Interface 12 that the next digital data signal is available for transfer to the CP/IO unit.

Identical cycles of operation are carried out for the remaining circuit cards 52 in the specified set of cards to be scanned sequentially, until the last card in the group is reached. The read-out functions for the last card are somewhat different from those associated with the previously selected cards of the sequential set, because the functions must include de-activating the point and group relays prior to transferring the digital data to the CP/IO unit. For that purpose, additional delay times are provided, much as in the case of the selection of a single relay card. In addition, at the termination of the sequential scanning mode, the sequential control circuitry must be de-activated.

When the last card is selected, the LSTA line (FIG. 2) will go high, because the card address CS1, etc., will be the same as the "last address" stored in the register 43. Returning now to FIG. 6, the active LSTA passes through And gate 264 to reset the flip-flop 161, thus inhibiting the short-time read-out path through And gate 160, etc., previously described. The active LSTA signal also enables gate 280 for purposes which will become evident.

Activation of CENB for this last card serves, as previously described, to close the solid-state output switch 260 of the last relay card selected. This card also sends back the RACK control signal, and the analog measurement signal is available for read-out. The RACK control signal passes through the path which includes And gate 320, Or gate 140, And gate 142 (when strobed by one-shot 146), delay-time one-shot 150, Or gate 152, and the A-to-D converter one-shot 154. The leading edge of the pulse from this one-shot turns on the Converter 20. The trailing edge of this pulse cuts off the input to the converter, and simultaneously passes through And gate 280 to reset the flip-flop 250 and turn off RGEN.

When RGEN becomes inactive, all of the group relays 226 of the multiplexing nest are de-energized, because the respective And gates 252 (FIG. 7) are disabled to cut off the energizing current path to those relays. Simultaneously, the output switch 260 of the last card opens. RGEN going inactive also starts the group relay timing one-shot (FIG. 6) which produces a 1.5 millisecond pulse providing time for the group relays to be fully de-activated before de-energization of the point relays 214.

The trailing edge of this 1.5 millisecond pulse is directed over line 330 to reset the SEQ flip-flop 306, thereby cutting off the special energizing path which provides energizing signals for all of the point relays in the nest. The normal energizing path for the point relay in the last relay card is also cut-off at this time. That is, the trailing-edge of the 1.5 millisecond timing pulse turns on the point relay timing one-shot 284, and the leading edge of its 2.0 millisecond pulse, passing through gate 164 and line 166, resets the Card-Enable flip-flop 149. Thus, the CENB control signal goes inactive, so that And gate 206 (FIG. 7) is de-activated and the normal point relay energizing path for the selected card is interrupted.

At the end of the 2.0 millisecond time period, the pulse from one-shot 284 goes low to set the Data Ready flip-flop 170, which transmits the DRDY signal to the CP/IO unit. That unit thereupon takes the last digital data signal from the A-to-D converter 20. Thus, the sequential read-out is complete, and the equipment is conditioned for any further read-out cycles as required by the CP/IO unit.

A shielding technique called guarding is used to minimize errors in the analog read-out signal due to capacitive coupling from adjacent circuits. Guarding serves to reduce the effective capacitance of the data amplifier input leads to ground. The "floating" differential input leads of the data amplifier 19 (FIG. 1) are provided with a shield 348 driven by a guard amplifier 350. This amplifier holds the shield at a potential equal to the average common-mode voltage at the input of the data amplifier. In addition, the signal path from the output of the multiplexer switch (104 or 260) to the input of the differential data amplifier is enclosed, to the extent possible, by a shield (not shown) also driven by the guard amplifier.

Referring to the right-hand edge of FIG. 5, the output line 352 of the guard amplifier 350 is connected to a pair of Junction-FET switches 354. These switches are normally closed to connect the guard voltage from line 352 to the signal lines at the input side 102 of the solid-state output switch 104. The guard voltage also is connected to shields (not shown) for the remainder of the multiplex switch circuitry.

When an analog point is selected from the circuit card 52A shown in FIG. 5, the output switch 104 is closed by a control signal from amplifier 110. This same control signal is coupled to the gates of the Junction-FET switches 354 and serves to open those switches, thereby removing the guard potential from the analog signal lines. The analog lines of all of the remaining non-selected switch cards continue to be held at guard potential, however, to minimize capacitive feed-through to the data amplifier.

It may be noted that the bias voltage on the MOSFET switch 104 must be maintained more positive than the guard voltage on the analog lines at the input electrodes 102. This is accomplished by bias circuit 356 supplied from the guard amplifier with a voltage VG which varies in correspondence with the guard potential. This circuit 356 produces a bias voltage which at all times is 3 volts more positive than the guard potential.

Referring now to FIG. 7, it will be seen that the relay card 52B includes a guard-switching circuit 360 comprised of a MOSFET switch 362 and a Junction — FET switch 364, both connected through resistors 366, 368 to the respective analog signal lines. The switch 364 is normally closed, to couple the guard potential to the analog lines; the other switch 362 is normally open. When an analog point is selected from the relay card, the switch signal from And gate 256 is directed through amplifiers 370, 372, to close MOSET switch 362 and open Junction — FET switch 364. The opened switch 364 removes the guard potential from the analog signal lines. The closed switch 362 references the analog signal on the flying capacitor to local ground on the selected card.

This guarding arrangement provides superior common mode rejection for systems with large numbers of analog inputs while maintaining system compatibility with the various types of switch cards. The compatibility feature also is of importance because it permits switch cards to be intermixed in any desired fashion in the multiplexing nest, and thus also permits switch cards to be changed in the field without requiring other circuit alterations to accommodate such changes.

For some processes, it is desirable to provide means for automatically checking to determine if any of the customer's analog signal lines have become open-circuited. Typically, such a check is made to spot thermocouples which have opened up. This can be checked in the present system by an open-channel detection useful especially with relay switch circuits.

In accordance with this technique, the CP/IO unit sends, with its instruction word to the Control Nest 14, a signal bit commanding an open channel detection pulse (OCDP) cycle. This bit is decoded and used to activate an OCDP Driver 380 (FIG. 4) in the control card 50. The output of this driver activates a known type of circuit illustrated by block 400 (FIG. 1) and which, upon completion of the read-out operation, directs a current pulse back through signal line 106 to the capacitor of the filter circuit of the selected channel.

If the thermocouple connected to the selected channel is in proper condition, the filter capacitor will rapidly discharge through the low-resistance thermocouple path. However, if the thermocouple is burned out, the filter capacitor will remain charged and, when the next read-out cycle is performed on that channel, will produce a positive full-scale A-to-D output. Such an output signal is detected by the CP/IO unit as an open channel, and suitable alarm signals are developed to alert the process operating personnel.

Although a specific preferred embodiment of the invention has been described hereinabove in detail, this is not to be considered as necessarily limiting of the invention, it being understood that numerous changes can be made within the scope of the invention to suit the technical requirements of particular applications.

We claim:

1. In an industrial process instrumentation system for use with complex processes having a number of variable conditions, the system including a central processor organized in a time-share configuration to perform computations respecting the values of the process conditions so as to produce signals for use in operating the process, said system further comprising an analog multiplexing input section to receive a plurality of analog signal lines each carrying an analog signal corresponding to the value of a respective process condition;

the improvement in such multiplexing input section which comprises;

a plurality of individual circuit cards each carrying at least one switching circuit to which an analog signal line is to be connected;

control circuit means responsive to signals from said central processor for directing to said circuit cards select signals identifying the specific switching circuit to be activated;

said circuit cards including acknowledge circuit means responsive to said select signals and operable at the selected card to transmit back to said control circuit means an acknowledge signal indicating that the selected circuit card is available for operation.

2. A system as claimed in claim 1, wherein said circuit cards comprise a first group containing switching circuits of a first type suited for use with a particular class of analog signals, and a second group containing switching circuits of a second type suited for use with analog signals of another class, said acknowledge circuit means including means to produce an acknowledge signal indicating whether the selected card is from said first or said second group.

3. A system as claimed in claim 2, wherein said first and second switching circuit types are relay and solid-state switching circuits, respectively.

4. A system as claimed in claim 2, wherein the switching circuits on at least a portion of said cards comprise a point switch serially connected with an output switch;

the output switches of all cards having identical electrical characteristics.

5. A system as claimed in claim 4, wherein said first and second switching circuit types are relay and solid state, respectively;

said output switches of both groups of cards being of solid-state type.

6. A system as claimed in claim 1, wherein said control circuit means includes activating means responsive to said acknowledge signal for effecting further control procedures respecting the read-out of data from the selected circuit card.

7. A system as claimed in claim 6, including an analog-to-digital converter;

said activating means including means to activate said analog-to-digital converter to convert the analog signal from the selected card to a corresponding digital signal for transfer to the central processor.

8. A system as claimed in claim 7, wherein said activating means includes timing means to delay activation of said converter for a period of time sufficient to assure proper closure of the selected switching circuit.

9. A system as claimed in claim 6, wherein said activating means includes signaling means for sending a control signal back to the acknowledging card, to carry out further functions at said card.

10. A system as claimed in claim 9, wherein said signaling means produces a signal for controlling the closure of the selected switching circuit at the selected card.

11. A system as claimed in claim 6, wherein said circuit cards comprise first and second groups having relay and solid-state switching circuits, respectively;

said acknowledge signal serving to indicate whether the selected card is a relay or solid-state type;

said activating means including signaling means for directing to a selected relay card a control signal for energizing a relay on that card.

12. A system as claimed in claim 11, wherein each relay switching circuit comprises first and second serially-controlled relays;

said select signals serving to energize said first relay;

said control signal serving to energize said second relay.

13. A system as claimed in claim 12, wherein each relay card includes a group of said first relays, serving as point relays, said second relay being connected in common to the group of point relays.

14. A system as claimed in claim 12, wherein said signaling means includes time delay means to delay activation of said second relay a sufficient time to assure stable closure of said first relay.

15. In an industrial process instrumentation system for use with complex processes having a number of variable conditions, the system including a central processor organized in a time-share configuration to perform computations respecting the values of the process conditions so as to produce signals for use in operating the process, said system further comprising an analog multiplexing input section to receive a plurality of analog signal lines each carrying an analog signal corresponding to the value of a respective process condition; the improvement in such multiplexing input section which comprises;

a plurality of individual circuit cards each carrying at least one switching circuit to which an analog signal line is to be connected;

first control circuit means responsive to initiating signals from said central processor for directing to said circuit cards select signals identifying the specific switching circuit to be activated;

an analog-to-digital converter;

second circuit means for producing control signals operable after activation of the selected switching circuit to direct the corresponding analog signal through said converter to produce a digital signal for transfer back to said central processor; and third circuit means for signalling said central processor when a digital signal is available for transfer.

16. In an industrial process instrumentation system for use with complex processes having a number of variable conditions, the system including a central processor organized in a time-share configuration to perform computations respecting the values of the process conditions so as to produce signals for use in operating the process, said system further comprising an analog multiplexing input section to receive a plurality of analog signal lines each carrying an analog signal corresponding to the value of a respective process condition; the improvement in such multiplexing input section which comprises;

a plurality of individual circuit cards each carrying at least one switching circuit to which an analog signal line is to be connected;

control circuit means responsive to an instruction signal from said central processor for directing to said circuit cards select signals identifying a specific switching circuit to be activated;

said control circuit means including sequential means for producing a sequential series of select signals identifying a corresponding series of said switching circuits in predetermined order, whereby to effect read-out of a group of analog signals in response to a single instruction signal from said central processor.

17. A system as claimed in claim 16, including means responsive to the completion of read-out of each selected switching circuit for activating the select signal for the next switching circuit in the sequence.

18. A system as claimed in claim 17, wherein said circuit cards comprise a plurality of switching circuits each having a relay followed by a solid-state output switch;

said control circuit means including means to activate concurrently all of the relays of the selected sequential group;

said sequential means including means to activate in sequence the solid-state output switches of the selected group.

19. In an industrial process instrumentation system for use with complex processes having a number of variable conditions, the system including a central processor organized in a time-share configuration to perform computations respecting the values of the process conditions so as to produce signals for use in operating the process, said system further comprising an analog multiplexing input section to receive a plurality of analog signal lines each carrying an analog signal corresponding to the value of a respective process condition; the improvement in such multiplexing input section which comprises:

a plurality of relay switches to which respective analog signal lines are connectible;

a plurality of high-speed output switches for said relay switches respectively;

control circuit means responsive to an instruction signal from said central processor for energizing a selected group of said relay switches concurrently;

said control circuit means including readout means to activate in sequence the output switches for the energized relay switches, to read-out the analog signals rapidly for transfer to said central processor.

20. A system as claimed in claim 19, wherein said output switches are solid-state switches.

21. A system as claimed in claim 20, wherein said relay switches are mounted on printed circuit cards.

22. A system as claimed in claim 21, wherein said relay circuit cards include a plurality of individual relay switches each connectible to a corresponding analog measurement point.

23. A system as claimed in claim 22, wherein each relay circuit card includes one solid-state output switch common to the group of relay switches on that card.

24. A system as claimed in claim 23, wherein each relay circuit card includes decoding means responsive to a digital point-select signal for activating a selected relay switch.

25. A system as claimed in claim 24, wherein the instruction signal from the central processor identifies one point in each circuit card to be read-out;

said control circuit means including means to energize concurrently the particular relay switches for that point in each relay circuit card;

said read-out means serving to activate in sequence the solid-state output switches for the selected group of circuit cards.

26. A system as claimed in claim 19, wherein said control circuit means comprises an address register to store a signal identifying a particular switch circuit to be read-out; and means for incrementing said address register following each read-out operation, to identify the next switch circuit in the sequence.

27. In an industrial process instrumentation system for use with processes having a number of variable conditions, the system including a central processor organized in a time-sharing configuration to perform computations respecting the values of process conditions and to produce signals responsive thereto; said system further comprising an analog multiplexing input section having a plurality of relatively slow relay-type switches each individually selectable to make connection to a corresponding analog measurement signal to be read-out;

the method of operating such a system which comprises the steps of:
operating said central processor to produce signals identifying a group of relay-type switches to be read-out in sequence;
activating concurrently all of the relay-type switches identified by said processor signals;
operating a series of high-speed, solid-state switches sequentially to make connection to the respective outputs of said activated relay-type switches; and
converting each analog measurement signal developed by said solid-state switches to digital format in preparation for transfer to said central processor.

28. In an industrial process instrumentation system for use with complex processes having a number of variable conditions, the system including a central processor organized in a time-share configuration to perform computations respecting the values of the process conditions so as to produce signals for use in operating the process, said system further comprising an analog multiplexing input section to receive a plurality of analog signal lines each carrying an analog signal corresponding to the value of a respective process condition;
the improvement in such multiplexing input section which comprises:
a plurality of switching circuits each including a switch to which respective analog signal lines are con-nectible;
an output line connected to the output of each of said switches to direct the corresponding analog signal to an analog-to-digital converter;
means for selectively activating any of said switches;
guard means coupled to said output line and operable to produce a guard voltage responsive to the average common-mode potential at said line; and
circuit means for directing said guard voltage to input elements of said switching circuits associated with the non-activated switches.

29. A system as claimed in claim 28, wherein said switch circuit elements comprise the analog signal lines connected to the inputs of the non-activated switches.

30. A system as claimed in claim 29, including a data amplifier connected between said output line and said analog-to-digital converter;
shield means for the input of said data amplifier; and
means connecting said guard voltage to said shield means.

31. In an industrial process instrumentation system for use with complex processes having a number of variable conditions, the system including a central processor organized in a time-share configuration to perform computations respecting the values of the process conditions so as to produce signals for use in operating the process, said system further comprising an analog multiplexing input section to receive a plurality of analog signal lines each carrying an analog signal corresponding to the value of a respective process condition;
the improvement in such multiplexing input section which comprises:
a plurality of switching circuits each including a relay-type switch to which respective analog signal lines are connectible;
an output line connected to the output of each of said switches to direct the corresponding analog signal to an analog-to-digital converter;
each of said relay-type switches comprising a flying capacitor connectible to the analog signal line and switchable to the output line;
means for selectively activating any of said switches to switch the corresponding capacitor to the output line and thereby direct to the analog-to-digital converter a signal corresponding to the charge on said capacitor developed by the analog signal connected to the activated switch; and
circuit means operable after the signal from the capacitor has been directed to the analog-to-digital converter, and including means for directing to the output line of an activated switch an electrical current for charging the corresponding flying capacitor, to provide an indication subsequently if the analog signal line connected to the switch has become open-circuited.

* * * * *